May 15, 1951 L. A. BIXBY ET AL 2,552,765
SHIFT CONTROL MECHANISM FOR CHANGE-SPEED GEARING
Filed May 28, 1949 2 Sheets-Sheet 2
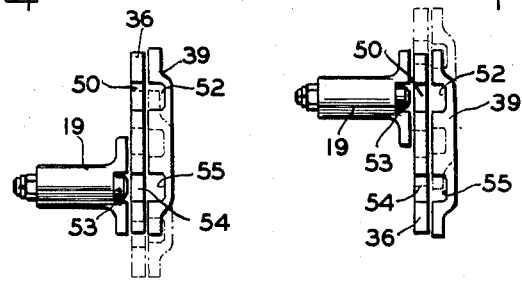
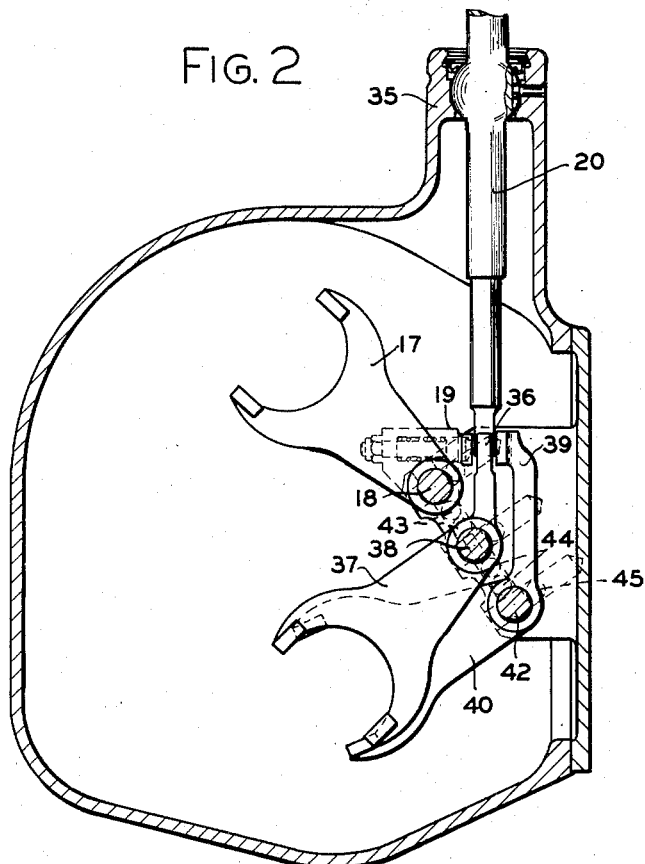
INVENTOR.
DONALD S. DENCE
LEO A. BIXBY
BY
Walter E. Schirmer
ATTY.

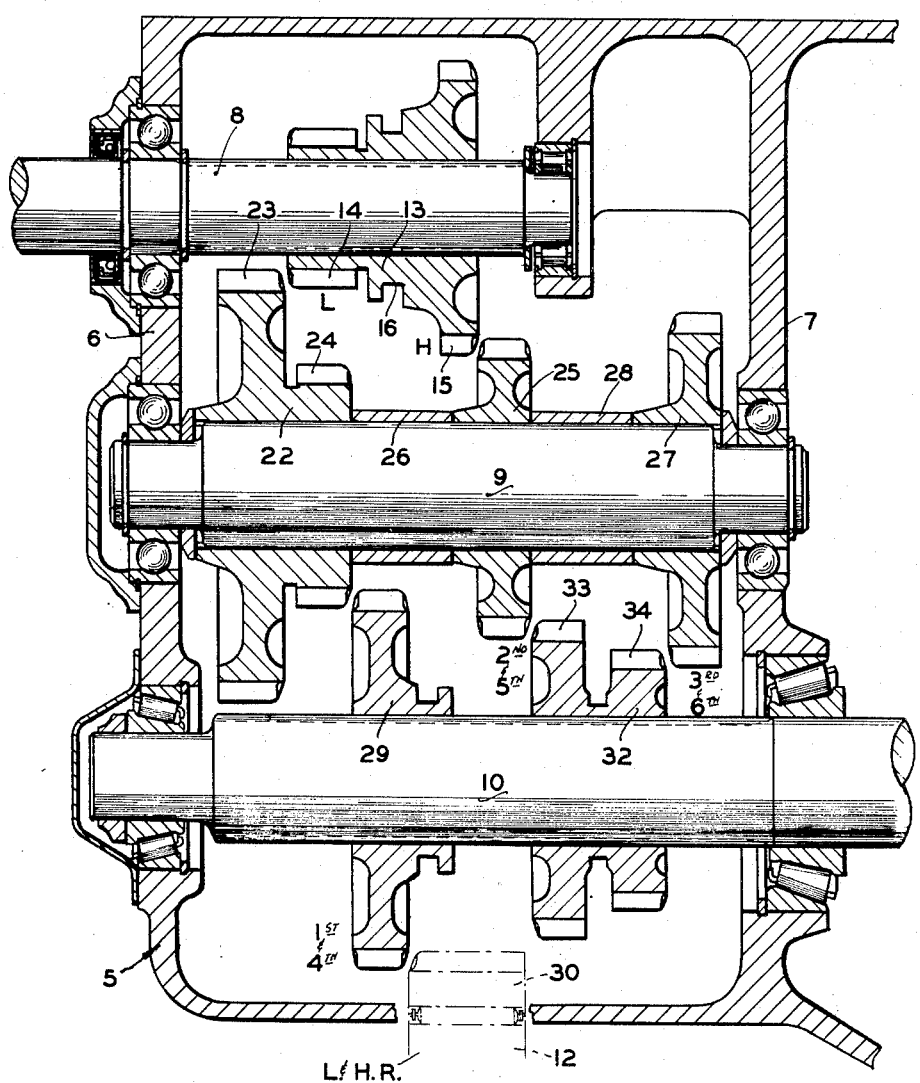

Patented May 15, 1951

2,552,765

UNITED STATES PATENT OFFICE 2,552,765

SHIFT CONTROL MECHANISM FOR CHANGE-SPEED GEARING

Leo A. Bixby, Niles, and Donald S. Dence, Berrien Springs, Mich., assignors to Clark Equipment Company, Buchanan, Mich., a corporation of Michigan Application May 28, 1949, Serial No. 95,970

1 Claim. (Cl. 74—473)

This invention relates to transmissions, and more particularly is concerned with a transmission construction having a low and high range by utilizing the same shift forks and shifting mechanism in each of these ranges.

Our invention is particularly shown in conjunction with a six speed transmission comprised of a three speed gear set and a high and low range gear set. The arrangement is such that the first three speeds and a low speed reverse are obtained when the transmission is in low range, and when shifted into high range, the top three speeds and the high reverse speed are obtained. This is accomplished with the use of only a single gear shift lever and three shift rails. This provides for a minimum requirement of space for the shifting mechanism, and a minimum amount of complex movement of the shift lever. This further simplifies the mounting of the gears in the transmission and the ability to reduce the axial length of the transmission while still obtaining the benefit of a multiple speed transmission.

Other objects and advantags of the present invention will appear more fully from the following detailed description which, taken in conjunction with the accompanying drawings, will disclose to those who are skilled in the art the particular construction and operation of a preferred form of the present invention.

In the drawings, Figure 1 is a vertical sectional view through a transmission embodying the present invention.

Figure 2 is a corresponding transverse sectional view through the transmission, with the gearing and shafts eliminated, but showing the shift forks and shift mechanism.

Figure 3 is a somewhat schematic drawing of the shift yoke mechanism in low range position; and Figure 4 is a corresponding view of this mechanism in high range position.

Referring now in detail to the drawings, the transmission case is indicated generally at 5 and comprises the end walls 6 and 7 within which are provided bearing journals of conventional type for supporting the input shaft 8, the intermediate shaft 9, and the output shaft 10. Each of these shafts, as will be seen, is rotatably supported in the end walls of the transmission in spaced parallel relationship.

Shown somewhat diagrammatically and out of position for the sake of clarity, is a reverse idler gear shaft 12 which preferably is located laterally between shafts 9 and 10.

The input shaft 8 is adapted to carry the compound gear 13 having a low range gear portion 14 and a high range gear portion 15, there being a suitable annular groove 16 formed in this gear for receiving the ends of the shift fork 17, shown in Figure 2 mounted upon the shift rail 18 and having the lug 19 for engagement by the shift lever indicated generally at 20.

Mounted on the shaft 9 are a plurality of axially spaced gears, including the compound gear 22 having a gear portion 23 adapted to have meshing engagement with the low range gear portion 14 of gear 13 when this gear is shifted to the left, as shown in Figure 1, and having a small pinion-like gear portion 24. There is an intermediate gear 25 mounted upon the shaft 9 and spaced axially from the gear 22 by means of the sleeve 26. The gear 25 has meshing engagement with the high range gear portion 15 of the gear 13 when it is shifted to the right from the position shown in Figure 1 which, as shown, is a neutral position. Adjacent the lower end of the shaft 9, there is provided the gear 27 spaced from the gear 25 by means of the spacing sleeve 28 and adjacent to the rear end wall 7 of the transmission.

The output shaft 10, as indicated, has a splined portion within the gear case 5, and has mounted thereon axially sliding gears, the gear 29 being adapted to be shifted axially to the left from the position shown in Figure 1, for meshing engagement with the gear portion 24 of gear 22 to provide a low speed drive to the shaft 10.

When shifted to the right from the position shown in Figure 1, the gear 29 is adapted to mesh with the reverse idler gear, shown diagrammatically at 30, which, in turn, has continuous meshing engagement with the gear 25 on shaft 9 to provide a reverse low speed drive to the output shaft. Spaced axially on the shaft 10, there is also provided the compound gear 32, having a first gear portion 33 adapted to mesh with the gear 25 when shifted to the left to provide a second or intermediate speed drive to the shaft 10. The gear portion 34 of the gear 32 is adapted to mesh with gear 27 when gear 32 is shifted to the right to provide third speed drive to the shaft 10. The first, intermediate, and third speed drives thus described, as well as the low speed reverse drive, are all capable of being effected when low range gear portion 14 of gear 13 is in mesh with gear portion 23 of gear 22, providing low range first, second, third and reverse speeds for the output shaft 10 as the gears 29 and 32 are shifted.

However, when the high range gear portion 15 of gear 13 is moved into engagement with gear 25, a high range drive is then provided to the output shaft 10, the fourth speed in this case being effected by shifting gear 29 to the left. Thus, gear 29, when in engagement with gear 24, can provide either first or fourth speed, depending upon whether the low or high range gear 13 is in engagement with either gear 23 or gear 25.

Similarly, when gear portion 33 of gear 32 is in engagement with gear 25, either second or fifth speed can be effected, depending upon the position of gear 13.

Third or sixth speed is controlled by meshing gear portion 34 of gear 32 with gear 27, depending upon the position of the low and high range gear 13. Reverse speed in either low or high range is provided by shifting gear 29 to the right.

The shift control mechanism for selecting the various speed ranges in the transmission is shown in Figures 2, 3, and 4. The shift lever 20 is preferably provided with a universal mounting within the shift tower 35, and has its lower extending end mounted for movement adjacent the shift lug 19 of the shifter fork 17, lug 36 of the shift fork 37 mounted upon rail 38, and lug 39 of shift fork 40 mounted upon rail 42.

Suitable interlocking balls, indicated diagrammatically at 43 and 44, are provided for interlocking the shift rails to prevent meshing of gears and spring detent balls 45 are provided for detaining the shift rails in their various shifted positions.

Considering Figure 3 in detail, the lug 19 connected to the shift fork 17, is shown here in low range position, with the lower end of the gear shift lever 20 engaged in the slot 50 of the intermediate lug member 36. The member 19 preferably has a spring pressed plunger which must be depressed by the lower end of the shift lever in order to allow engagement of this end in the lug, and when in the position shown in Figure 3, normally maintains the gear shift lever in engagement in the opening 50 of the lug 36 controlling shifter fork 37. Shifter fork 37, in turn, is engaged with gear 32 on shaft 10 and fore and aft movement of the shift lever 20 will result in shifting the shift fork 37 axially on the shift rail 38, forward movement of the lug providing for moving gear portion 33 into engagement with gear 25 and rearward movement of the lug providing for engagement of the gear portion 34 in gear 27.

When the shift lever is rocked laterally, the lower end thereof can be engaged providing lug 36 is returned to a neutral position, with lug 39 having the recess 52 for receiving the lower end of the shift lever. Fore and aft movement here produces corresponding movement of gear 29 either into first speed position, meshing with gear portion 24 of gear 22 or into position engaging reverse idler gear 30 for providing low reverse drive to the output shaft 10. It will be noted that both of the lugs 36 and 39 must be returned to neutral position before the gear shift lever can be laterally rocked back into engagement with the lug 19 controlling the low and high range gearing. When rocked back this way, the lug 19 can then be engaged by depression of the plunger 53 and moved into high range position, shown in Figure 4. This engages gear portion 15 of gear 13 with gear 25 on shaft 9.

It will be noted that the lug 36 carries an additional notched portion 54 which is now in direct alinement with the plunger 53 of shift lug 19, so that the plunger returns the lower end of the shift lever into this recess, whereby the intermediate lug 36 can be engaged by the shift lever for fore and aft movement of gear 32.

Similarly, further lateral rocking movement allows the lower end of the lever to traverse lug 36 and move into the recess 55 in lug 59, thereby engaging for movement the shifter fork 40 which controls fore and aft movement of the gear 29.

Here, again, it will be noted that both of the lugs 36 and 39 must be returned to neutral position before the low and high range gear 13 can again be shifted out of high range position. Thus, it is apparent that having once selected the range of speed, this range is maintained while first, second, third and low reverse, or fourth, fifth, sixth, and high reverse are selectively controlled by the operator, and that all gears must be returned to neutral position before the shift can be made from either low to high range or vice versa.

However, it will be noted that this can all be accomplished with only three shift rails and three shifter forks, even though six forward and two reverse speeds are provided.

It is therefore believed apparent that this provides a very simplified and easily selected gear shift control mechanism for a multiple speed transmission of this type, while still providing the necessary interlocking relationship to prevent any possibility of gear clashing.

We are aware that other embodiments of this invention may be employed without departing from the spirit of the present invention, and we therefore intend to be limited to our invention only as defined in the following claim.

We claim.

Gear shift means comprising, three parallel shift rails, a shift lug on one rail having a single recess, shift lugs on each of the other rails having a pair of axially spaced recesses, a gear shift lever, means mounting said lever for fore and aft and lateral rocking movement, said gear shift lever in one lateral position being adapted to engage said recess in said lug on said one rail for effecting fore and aft movement of the latter into one of two positions, said lug on said one rail being disposed when in either of said two positions into alignment with one of the recesses in said lugs on said other shift rail whereby said lever can be laterally rocked out of engagement with said recess in said lug on said one rail into the adjacent recess in the lug on either of said other two shift rails, and a spring biased plunger mounted in said lug on said one rail and projecting into the recess therein at one side thereof for normally biasing said shift lever laterally out of engagement with the latter.

LEO A. BIXBY.
DONALD S. DENCE.

REFERENCES CITED

The following references are of record in the file of this patent:

UNITED STATES PATENTS

| Number | Name | Date |
|---|---|---|
| 1,513,374 | Cozzens | Oct. 28, 1924 |
| 1,887,943 | Padgett | Nov. 15, 1932 |
| 2,017,101 | Lapsley | Oct. 15, 1935 |
| 2,214,805 | Baker | Sept. 17, 1940 |
| 2,220,197 | Ariens | Nov. 5, 1940 |
| 2,273,068 | Ross | Feb. 17, 1942 |
| 2,301,448 | Peterson | Nov. 10, 1942 |
| 2,307,857 | Rodler | Jan. 12, 1943 |
| 2,316,503 | Curtis | Apr. 13, 1943 |
| 2,323,384 | Eberhard | July 6, 1943 |

FOREIGN PATENTS

| Number | Country | Date |
|---|---|---|
| 558,392 | Great Britain | Jan. 4, 1944 |
| 799,949 | France | June 23, 1936 |